J. DEVEY, J. DEVEY, Jr. & W. A. DEVEY.
BEET TOPPER AND DIGGER.
APPLICATION FILED NOV. 17, 1909.

975,218.

Patented Nov. 8, 1910.
3 SHEETS—SHEET 1.

WITNESSES
Samuel E. Wade.
C. E. Trainor

INVENTORS
JOHN DEVEY
JOHN DEVEY, JR.
WALTER AVERY DEVEY
BY Munn & Co

ATTORNEYS

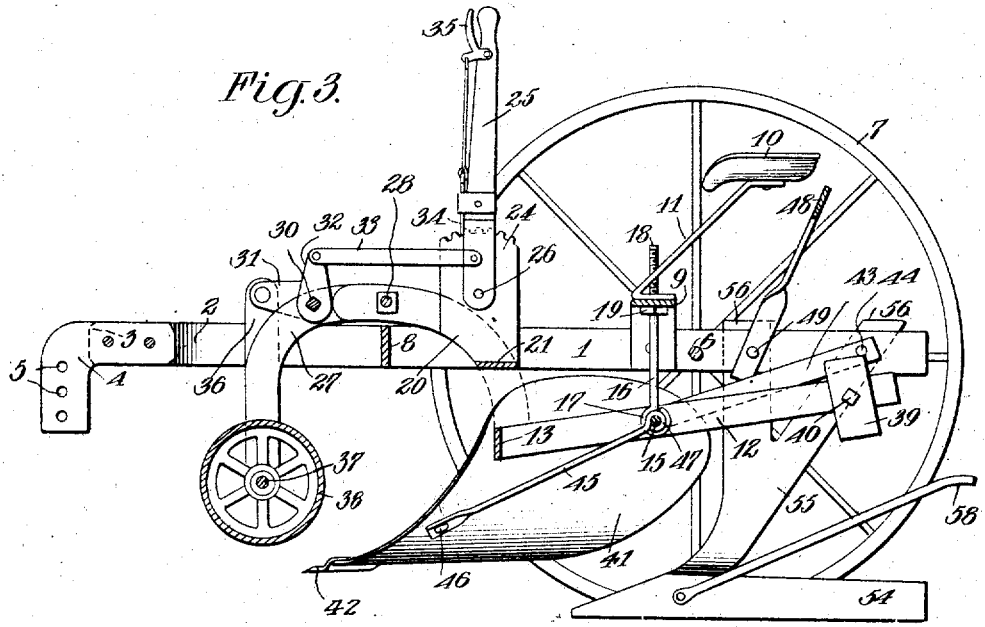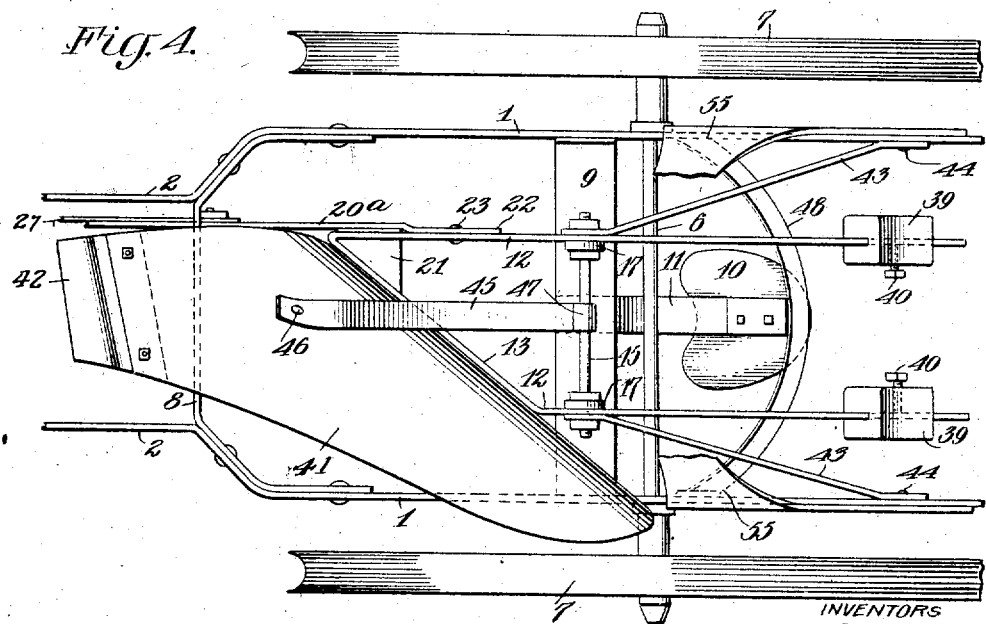

J. DEVEY, J. DEVEY, Jr. & W. A. DEVEY.
BEET TOPPER AND DIGGER.
APPLICATION FILED NOV. 17, 1909.
975,218.
Patented Nov. 8, 1910.
3 SHEETS—SHEET 3.
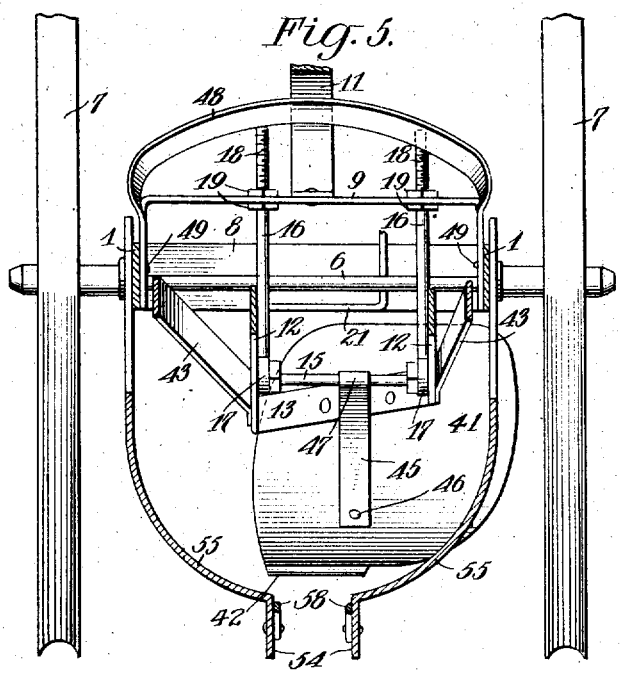
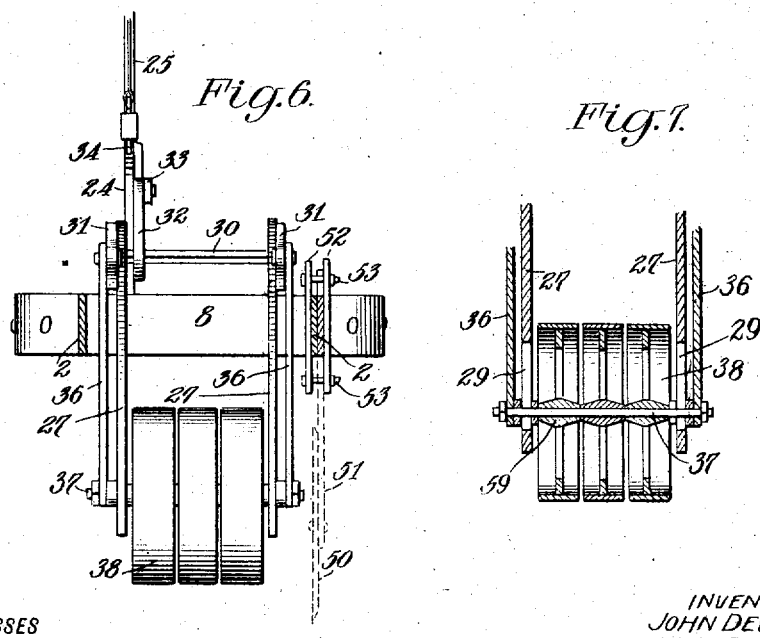
WITNESSES
Samuel E. Wade
C. E. Trainor
INVENTORS
JOHN DEVEY
JOHN DEVEY, Jr
WALTER AVERY DEVEY
BY Munn & Co.
ATTORNEYS

UNITED STATES PATENT OFFICE.

JOHN DEVEY, OF LEHI, JOHN DEVEY, JR., OF GARLAND, AND WALTER AVERY DEVEY, OF AMERICAN FORK, UTAH, ASSIGNORS OF ONE-EIGHTH TO JOSEPH FRANKLING DEVEY, OF GARLAND, UTAH, AND ONE-EIGHTH TO ALFRED JOHN DEVEY, OF ALPINE, UTAH.

BEET TOPPER AND DIGGER.

975,218.  Specification of Letters Patent.  Patented Nov. 8, 1910.

Application filed November 17, 1909. Serial No. 528,502.

*To all whom it may concern:*

Be it known that we, JOHN DEVEY, JOHN DEVEY, Jr., and WALTER AVERY DEVEY, citizens of the United States, and residents, respectively, of Lehi, in the county of Utah, State of Utah; Garland, in the county of Boxelder, State of Utah, and American Fork, in the county of Utah, State of Utah, have invented certain new and useful Improvements in Beet Toppers and Diggers, of which the following is a specification.

Our invention is an improvement in beet toppers and diggers, and consists in certain novel constructions and combinations of parts hereinafter described and claimed.

The object of the invention is to provide a simple, compact, and easily operated device of the character specified which will top the beets and remove the crown and top to one side of the row, and will afterward lift the beets and separate them from the soil, and wherein the cutter may be adjusted to cut the crowns at the desired point.

Figure 1:
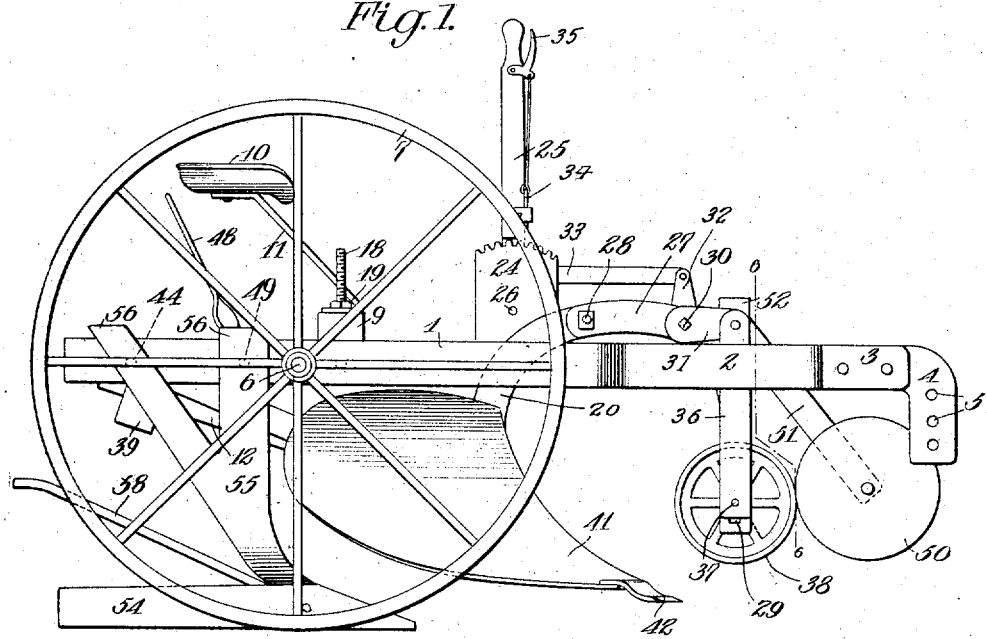
Figure 2:
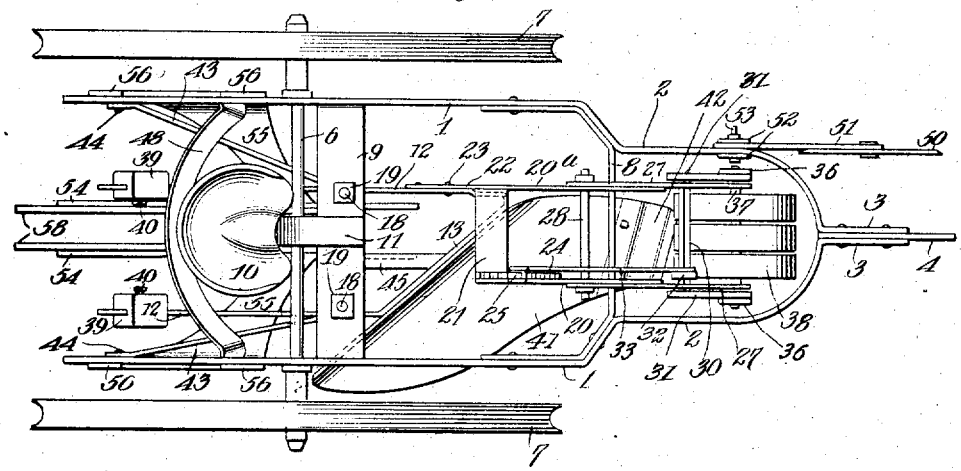

Referring to the drawings forming a part hereof: Figure 1 is a side view of the improvement; Fig. 2 is a top plan view; Fig. 3 is a vertical longitudinal section; Fig. 4 is a bottom plan view; Fig. 5 is a vertical transverse section; Fig. 6 is a section on the line 6—6 of Fig. 1; and Fig. 7 is a vertical section through the roller.

The embodiment of the invention shown in the drawing comprises a frame composed of side members 1, each of which is offset inwardly at its front end, as shown at 2, and is then bent inwardly, as at 3, and connected to a clevis 4, which is provided with a vertical series of openings 5 for receiving a doubletree (not shown) or other suitable means for drawing the same. An axle 6 is journaled in the side bars 1 near the rear of the frame, and wheels 7 are journaled on the axle. A cross bar 8 connects the side members at their junction with the offset portions, and another cross bar 9 connects them intermediate their rear ends and the cross bar 8, and a seat 10 is supported from the cross bar 9 by means of a spring plate 11.

A cutter comprising a share or moldboard 41 and a cutter 42 bolted thereto is supported by an auxiliary frame, consisting of side bars 12, and a cross bar 13, which is inclined to the side bars as shown, and secured to the share in any suitable manner. The side bars are connected intermediate their ends by a shaft 15, and the shaft is journaled in the one end of braces 43, having their other ends riveted to the side bars of the main frame, as at 44. Hangers 16 support the shaft, each hanger being provided with an eye 17 engaging the shaft, and a threaded stem 18, which extends through an opening in the cross bar 9, and is engaged above and below the bar by nuts 19, so that the position of the shaft with respect to the bar may be adjusted.

A second frame is arranged in front of the first frame, and is connected thereto. The said frame comprises arched side bars 20, 20ᵃ, and a cross bar 21, and one of the side bars 20ᵃ is extended rearwardly, as at 22, and riveted to the adjacent side bar of the auxiliary frame by rivets 23. A toothed quadrant 24 is secured to the side bar 20, and a lever 25 is pivoted to the quadrant, as at 26. An arm 27 is secured to each of the side bars 20, 20ᵃ by a bolt 28, which extends through both side bars and both arms, and the said arms are arched forwardly and downwardly and slotted, as at 29, near their lower ends. A square shaft 30 is journaled in the arms, and is provided at each end outside of the arms with an arm 31, and between the arms with an arm 32, and a link 33 connects the arm 32 with the lever 25. A tooth 34 is slidably mounted on the lever and coöperates with the quadrant, and a grip 35 pivoted to the lever is connected with the tooth for operating the same. Links 36 are connected with the ends of the arms 31 and depend therefrom, and in the lower ends of the arms is journaled a shaft 37, on which is journaled a roller composed of a plurality of wheels 38. It will be evident that by operating the lever 25 the shaft and roller will be raised and lowered, and the ends of the shaft extend through the slots 29, and are guided thereby in their movement.

Each of the side bars 12 of the auxiliary frame is provided with a weight 39, which is slidable on the bar, and is secured in place by a set-screw 40. The moldboard is also connected to the shaft 15 by a brace 45, which is provided at one end with an eye 47 encircling the shaft at approximately its center, and at the other is secured to the rear face of the moldboard by a rivet 46.

An arched cross bar 48 extends between the side bars 1 of the main frame near their rear ends, and is secured to each bar by a rivet or bolt 49. A rolling colter 50 is journaled on the lower end of a plate 51, and the opposite end of the plate is clamped to one of the side bars of the frame by means of plates 52, which are drawn together on the side bar and the plate by means of bolts 53.

Behind the moldboard are arranged the diggers 54, each comprising a blade arranged longitudinally of the machine, and supported by a bracket arm 55, whose upper end is forked, as at 56, and secured to the adjacent side member by the bolts 49 and 44 before mentioned. The bracket arms curve inwardly near their lower ends so that the diggers are near together and on each side of the longitudinal center of the machine, and each blade is provided with a fender rod 58 secured to its inner face and extending upwardly and rearwardly.

Each of the wheels 38 is provided with a hub 59, whose ends extend slightly beyond the faces of the wheel as shown in Fig. 7, and space the said wheels apart. The colter may be adjusted by loosening the bolts 53 and moving the plate 51 up or down. The depth of the cutter in the ground may be regulated by raising and lowering the wheels 38, which roll on the surface of the ground.

In operation the improved digger is drawn through the field with the wheels 38 running over the row of beets. The cutter is adjusted just low enough to cut the crown of the beet and to remove the crown and the top, which are then thrown to the side of the row by the moldboard. It will be observed that the cutter is of considerable width and the cutting edge is inclined slightly to the direction of movement of the machine. The tops and crowns are thus laid to one side and entirely separated from the beets. The diggers 54 then engage the beets and lift them from the soil, separating them from the soil, and leaving them in convenient position for picking up. The operator by adjusting the cutter can top the beets high or low, as may be desired. By adjusting the weights 39 the cutter and moldboard may be properly balanced to cut to the best advantage.

The wheels for supporting the frame are behind the topping device, consisting of the cutter and the moldboard for removing the tops, and the front end of the frame may be raised and lowered by means of the roller composed by the wheels 38, whereby to regulate the depth of the cut.

The machine broadly considered comprises a topper, the cutter, means for removing the tops, the moldboard, and the diggers.

We claim:

1. A machine of the class described, comprising a main frame, wheels near the rear end of the frame for supporting the same, a moldboard provided with a cutting edge, an auxiliary frame pivoted on the main frame and to whose front end the moldboard is secured, weights adjustable on the auxiliary frame for balancing the moldboard, a shaft in front of the moldboard, wheels on the shaft, means for raising and lowering the shaft, a rolling colter in front of the shaft, a digging device behind the moldboard, said device comprising a pair of blades arranged longitudinally of the frame and supported thereby, said blades being parallel and spaced apart from each other.

2. A machine of the class described, comprising a main frame, wheels near the rear end of the frame for supporting the same, a moldboard provided with a cutting edge, an auxiliary frame pivoted on the main frame and to whose front end the moldboard is secured, weights adjustable on the auxiliary frame for balancing the moldboard, a shaft in front of the moldboard, wheels on the shaft, means for raising and lowering the shaft, a rolling colter in front of the shaft, a digging device behind the moldboard, said device comprising a pair of blades arranged longitudinally of the frame and supported thereby.

3. A machine of the class described, comprising a main frame, wheels near the rear end of the frame for supporting the same, a moldboard provided with a cutting edge, an auxiliary frame pivoted on the main frame and to whose front end the moldboard is secured, weights adjustable on the auxiliary frame for balancing the moldboard, a shaft in front of the moldboard, wheels on the shaft, means for raising and lowering the shaft, a digging device behind the moldboard, said device comprising a pair of blades arranged longitudinally of the frame and supported thereby.

4. A machine of the class described, comprising a main frame, wheels near the rear end of the frame for supporting the same, a moldboard provided with a cutting edge, an auxiliary frame pivoted on the main frame and to whose front end the moldboard is secured, weights adjustable on the auxiliary frame for balancing the moldboard, a shaft in front of the moldboard, wheels on the shaft, means for raising and lowering the shaft, and a digging device behind the moldboard.

5. A machine of the class described, comprising a wheel supported main frame, an auxiliary frame pivoted on the main frame, a moldboard having a cutting edge secured to the front end thereof, a counterbalance for the moldboard, a shaft in front of the moldboard and supported from the frame, wheels on the shaft, means for raising and lowering the shaft, and a plurality of digging blades behind the moldboard.

6. In a machine of the class described, a wheel supported frame, a cutting blade for topping the beets, and a mold board for moving the tops to one side, an auxiliary frame supporting said blade and mold board and pivoted on the main frame, a counterbalance for the frame, and means for digging the beets behind the mold board and supported by the main frame.

7. In a machine of the class described, a wheel supported frame, a cutting blade for topping the beets, and a mold board for moving the tops to one side, an auxiliary frame supporting said blade and mold board, and pivoted on the main frame, and a counterbalance for the frame.

JOHN DEVEY.
JOHN DEVEY, Jr.
WALTER AVERY DEVEY.

Witnesses as to the signatures of John Devey and Walter Avery Devey:
  CHAS. C. FRIEL,
  ELIAS M. JONES.

Witnesses as to the signature of John Devey, Jr.:
  JOSEPH JENSEN,
  FELIX D. BAIRD.